US 6,443,051 B1

(12) United States Patent
Suzuki (10) Patent No.: US 6,443,051 B1
(45) Date of Patent: Sep. 3, 2002

(54) FRYER (75) Inventor: Akira Suzuki, Nagoya (JP)

(73) Assignee: Paloma Industries, Limited, Aichi (JP)

( * ) Notice: Subject to any disclaimer, the term of this patent is extended or adjusted under 35 U.S.C. 154(b) by 0 days.

(21) Appl. No.: 10/060,130

(22) Filed: Jan. 30, 2002

(30) Foreign Application Priority Data

Feb. 2, 2001 (JP) ........................................ 2001-026902

(51) Int. Cl.[7] ............................................... A47J 37/12
(52) U.S. Cl. ........................... 99/330; 99/331; 99/342; 99/403; 126/391.1
(58) Field of Search ........................... 99/325–334, 337, 99/338, 342, 403–410; 126/391.1, 389.1, 390.1, 378.1; 210/167, DIG. 8; 219/492, 494, 497, 506, 508, 442, 486, 510, 512; 340/589; 426/231–233, 438, 519, 808; 431/326, 1, 170; 700/90, 99, 85, 300

(56) References Cited

U.S. PATENT DOCUMENTS

| | | | | |
|---|---|---|---|---|
| 4,228,730 A | * | 10/1980 | Schindler et al. | 99/407 |
| 4,372,980 A | * | 2/1983 | Luebke et al. | 426/231 |
| 4,639,213 A | * | 1/1987 | Simpson | 431/326 |
| 4,663,710 A | * | 5/1987 | Waugh et al. | 700/90 |
| 4,672,540 A | * | 6/1987 | Waugh et al. | 700/90 |
| 4,848,318 A | * | 7/1989 | Brewer | 126/391.1 |
| 4,858,119 A | * | 8/1989 | Waugh et al. | 700/90 |
| 4,913,041 A | | 4/1990 | Taber et al. | |
| 4,976,609 A | | 12/1990 | Grob et al. | |
| 5,038,753 A | * | 8/1991 | Yokoyama et al. | 99/403 X |
| 5,101,558 A | | 4/1992 | Grob et al. | |
| 5,185,168 A | * | 2/1993 | Takahashi | 426/438 X |
| 5,261,322 A | * | 11/1993 | Yokoyama et al. | 99/403 X |
| 5,417,202 A | * | 5/1995 | Cote | 99/403 X |
| 5,490,449 A | * | 2/1996 | Meister et al. | 99/403 |
| 5,544,567 A | | 8/1996 | Davis et al. | |
| 5,706,717 A | * | 1/1998 | Barner | 99/330 |

* cited by examiner

Primary Examiner—Timothy F. Simone
(74) Attorney, Agent, or Firm—Pearson & Pearson, LLP (57) ABSTRACT It is an object of the invention to achieve an improvement in the operating reliability of a cooking controller and to extend its lifetime. A cooking controller (18) is provided within a casing (21), and an insulating material (22) for blocking out the heat emitted from an oil vat (3) is provided on the wall of the casing (21) on the side of the oil vat (3). A top opening (23) and a bottom opening (24) are provided in the top wall and bottom wall of the casing (21), and a cooling fan (25) is provided at an intermediate position within an air circulation route (29) from the bottom opening (24) to the top opening (23). The cooling fan (25) is operated and the generated flow of the air passing between the openings cools and insulates the heat emitted from the oil vat (3) towards the cooking controller (18). Thus, temperature increases within the cooking controller (18) can be inhibited, and operational reliability and the lifespan of the cooking controller (18) can be increased.

8 Claims, 6 Drawing Sheets

FIG.1 heat emitted from oil vat

(PRIOR ART)

FIG.7
(PRIOR ART)

FRYER

BACKGROUND OF THE INVENTION

1. Field of the Invention

The present invention relates to an industrial fryer for cooking foods, which is provided with a plurality of oil vats.

2. Description of Related Art

Figure 6:
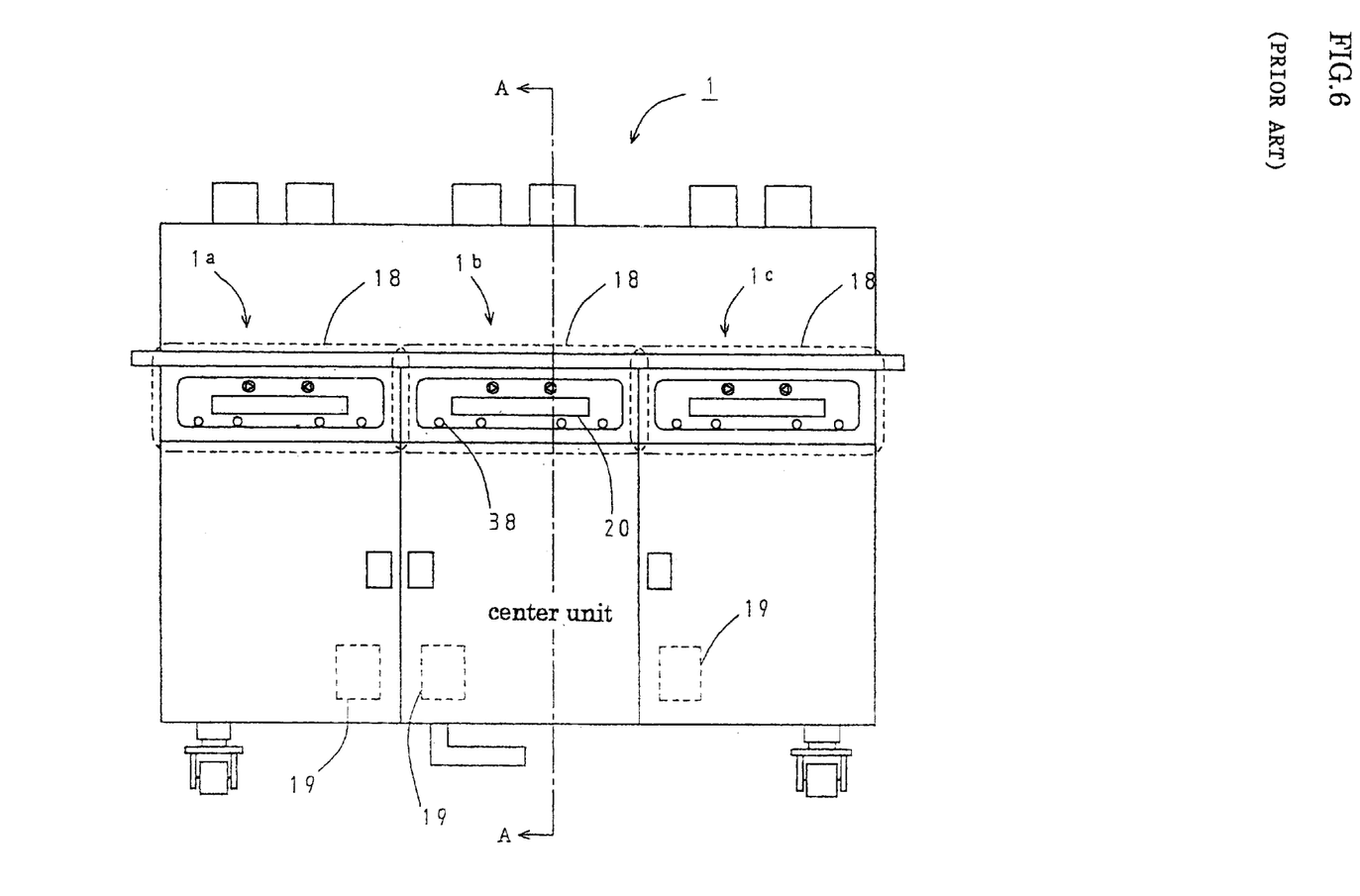
FIG. 6 is a front view of a three-vat type fryer for the conventional example and the present embodiment.
Figure 7:
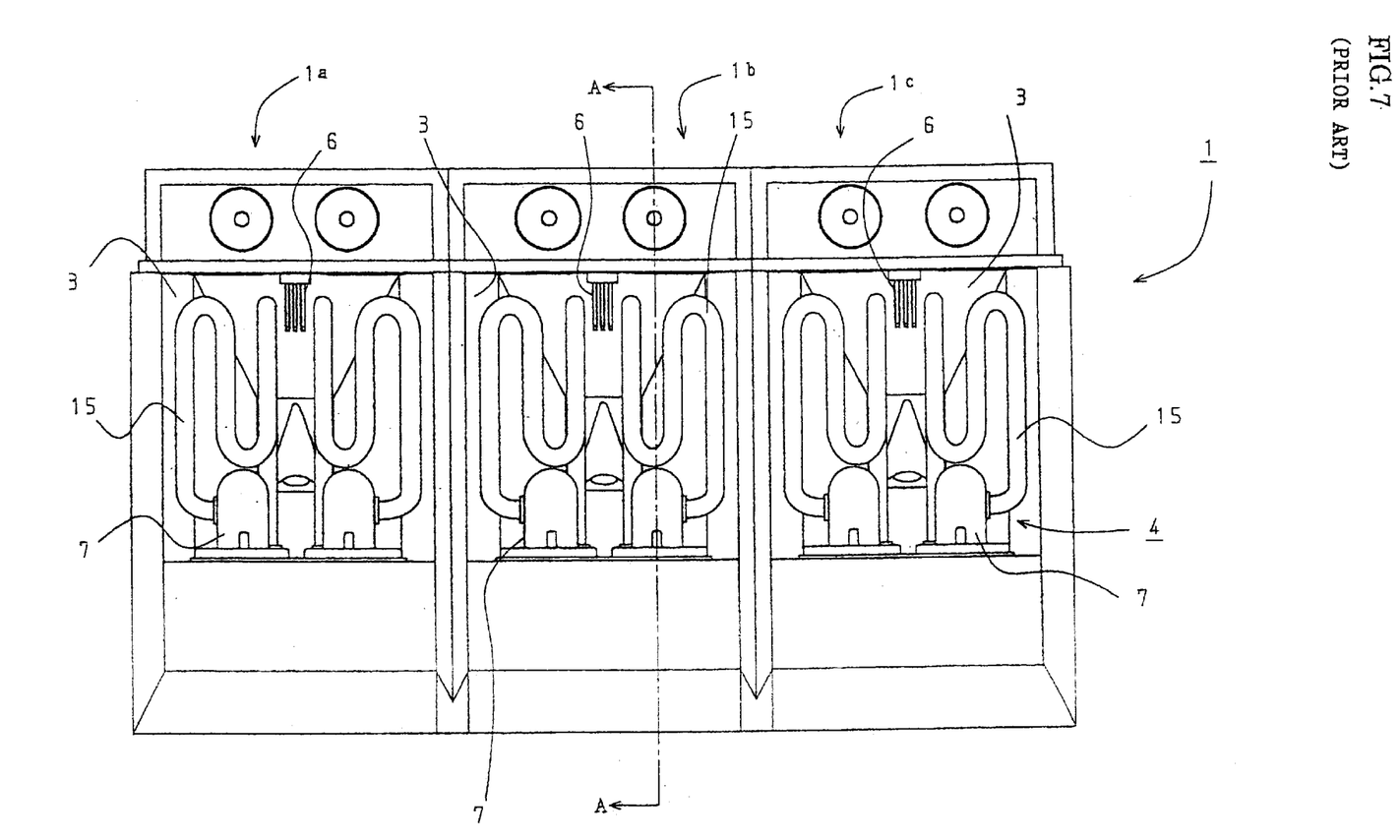
FIG. 7 is a top view of a three-vat type fryer for the conventional example and the present embodiment.

Conventionally, fryers provided with a plurality of oil vats are known as industrial fryers. An example of a three-vat type fryer provided with three oil vats is shown in FIGS. 6 and 7. In this fryer 1, three fryer units 1a, 1b, and 1c are provided together in a row within a main casing. The fryer units 1a, 1b, and 1c are each provided with, for example, an oil vat 3 for containing cooking oil (hereinafter, simply "oil"), two pulse burners 4 for heating the oil within the oil vat 3, a cooking controller 18, and a heating controller 19, and basically share the same configuration.

The control portion of the fryer 1 is made up of the cooking controller 18, which is for setting the cooking time and the temperature in accordance with the cooking program via a control panel, and the heating controller 19, which is for controlling the operation of the pulse burners 4 so that the temperature of the oil is maintained at the temperature designated by the cooking controller 18. The cooking controller 18 is provided at the top of the front side of the apparatus for easy control by the operator, and is positioned adjacent to the oil vat 3 due to the structure of the fryer 1. Therefore the cooking controller 18 is heated by the heat emitted from the oil vat 3. Accordingly, to prevent poor performance and a reduced lifetime due to overheating of the cooking controller 18, an insulting material was conventionally provided between the oil vat 3 and the cooking controller 18. Alternatively, the cooking controller 18 was cooled and insulated by the flow of air resulting from the force of the natural draft which was generated within the casing housing the cooking controller 18.

In the three-vat type fryer depicted in FIGS. 6 and 7, the cooking controller 18 of the fryer unit 1b in the middle receives both the heat emitted from the left and right side oil vats 3, but as for the fryer units 1a and 1c, it is not such a problem. Thus, there was the risk that overheating could not be sufficiently prevented with this conventional configuration.

It is an object of the fryer of the present invention to solve this problem, and to achieve increased operational reliability of the cooking controller and to extend its lifetime.

SUMMARY OF THE INVENTION

A fryer of the present invention for solving the above problem, is a multi-vat fryer in which at least three fryer units are provided in a row, each fryer unit being provided with an oil vat for containing cooking oil, a heating control means for controlling the heating of the cooking oil, and a cooking controller for carrying out settings such as temperature settings and a cooking program while sending a control signal to the heating control means, wherein the cooking controller of each fryer unit includes a connection detecting means for detecting whether a cooling fan for preventing an electronic circuit board in the cooking controller from overheating is connected, and a driving means for driving the cooling fan;

and the cooling fan is provided only in the cooking controller of a specific fryer unit of the plurality of fryer units.

A feature of a fryer of the present invention is that in the fryer, three fryer units are provided in a row, and the cooling fan is provided only for the cooking controller of the middle fryer unit.

A feature of a fryer of the present invention is that in the fryer, the cooking controller is provided with a control display portion for controlling and displaying temperature settings and the cooking program, for example, and the control display portion displays whether the cooling fan detected by the connection detecting means is connected.

With the fryer of the present invention having the above configuration, the heating control means heats cooking oil in the oil vat based on the cooking program and/or temperature setting set by the cooking controller. If a cooling fan is connected, the cooking controller detects the connection with the connection detecting means and drives it with the driving means. Thus, simply by connecting a cooling fan to a specific cooking controller to be prevented from overheating, the cooling fan is appropriately driven and cools and insulates against the heat emitted from the oil vats. Moreover, to switch between driving and not-driving the fan, it is unnecessary to perform troublesome settings and maintenance such as setting the status of the fan connection at each cooking controller or dividing the specifications for the cooking controllers to which the cooling fan is connected into "fan-connected type" and "no-fan-connected type" when manufacturing.

With the fryer of the present invention, three fryer units are provided in a row, and the cooking controller of the middle fryer unit is heated by the heat emitted from the oil vats of the left and right fryer units, but it is cooled and insulated by the cooling fan, and thus does not become particularly hot.

With the fryer of the present invention, the connection detecting means recognizes whether the cooling fan is connected, and this is displayed on the control display portion provided for the cooking controller.

With the fryer of the present invention, the cooling fan is controlled according to the temperature of the cooking controller, which is detected by the temperature sensor. This means that the cooling fan can be controlled so that it only operates when said detected temperature is above a specific value, although the temperature of the cooking controller may change due to the environment surrounding the fryer or how the fryer is used.

DESCRIPTION OF THE PREFERRED EMBODIMENTS

A preferred embodiment of the fryer of the present invention is described below with reference to FIGS. 1 to 7, further clarifying the configuration and operation of the present invention as described above.

FIG. 6 is a front view of a three-vat type fryer, and FIG. 7 is a top view of the three-vat type fryer. The front and top views of the fryer of the present embodiment are identical to those of the conventional fryer.

A fryer 1, which is a three-vat type fryer including three vats, is provided with three fryer units 1a, 1b, and 1c arranged together in a row within a main casing. The fryer units 1a, 1b, and 1c are each provided with, for example, an oil vat 3 for containing oil, two pulse burners 4 for heating the oil within the oil vat 3, a cooking controller 18, and a heating controller 19, and basically share the same configuration. The following description is of the fryer unit 1b in the middle, and because the other fryer units 1a and 1c have a common configuration with the fryer unit 1b, their explanation will be omitted.

Figure 2:
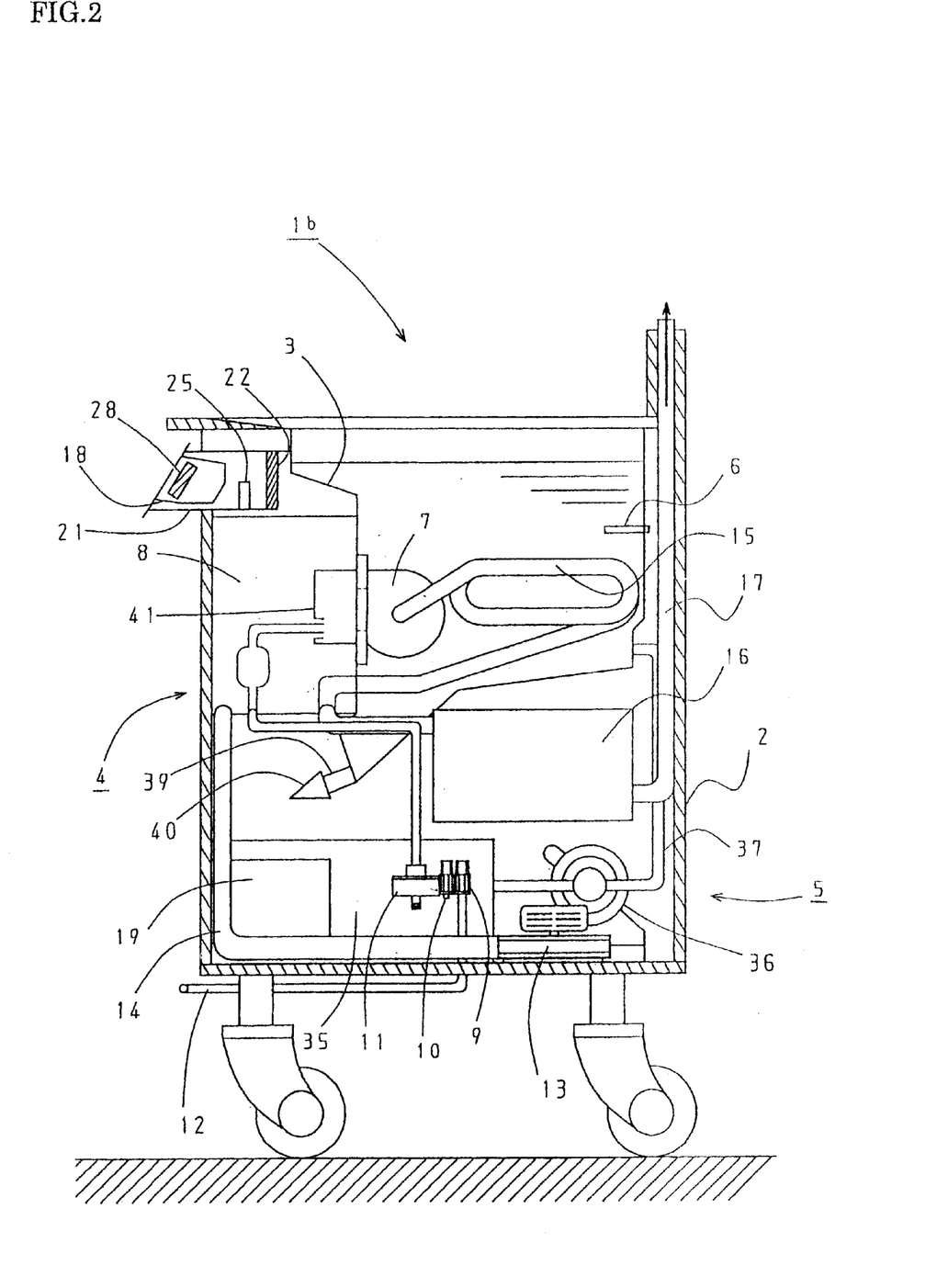
FIG. 2 is a schematic lateral cross-sectional view of the middle fryer unit of a three-vat type fryer for the present embodiment.

FIG. 2 illustrates the internal structure of the middle fryer unit 1b, and is a schematic lateral cross-sectional view cut along the segmented line A—A in FIGS. 6 and 7.

The oil vat 3, the pulse burners 4 and an oil cleaner 5 for filtering the oil in the oil vat 3 are provided inside a main casing 2 of the fryer unit 1b. The oil vat 3 is filled with oil for deep frying foods, and the pulse burners 4 serve as the heating means for heating the oil. An oil temperature sensor 6 for detecting the temperature of the oil is provided within the oil vat 3.

The pulse burners 4 have a combustion chamber 7 formed within the oil vat 3 and a mixing chamber 41 that is in communication with the combustion chamber 7 outside the oil vat 3. An air chamber 8 is provided around the mixing chamber 41. A gas pipe 12 for supplying the fuel gas is connected to the mixing chamber 41 and provided with, from the upstream side, an intake electromagnetic valve 9, a main electromagnetic valve 10, and a gas governor 11. Combustion air can be supplied to the air chamber 8 by an air supply pipe 14 provided with a fan 13.

Furthermore, a tail pipe 15 is connected to the combustion chamber 7 within the oil vat 3, and outside the oil vat 3 the tail pipe 15 is connected to an exhaust duct 17, which opens to the outside, via a decoupler 16.

The bottom wall of the oil vat 3 slopes diagonally downward from the rear of the fryer unit 1b toward the front, and a discharge duct 39 for discharging oil is provided at the side wall of the bottommost portion thereof. A discharge opening 40 is attached to the tip of the discharge duct 39. The oil cleaner 5 is made up of an oil tank 35 for receiving dirty oil from the oil vat 3 through the discharge opening 40, an oil filter (not shown in the drawings) stretched in a sheet-like fashion slightly above the bottom portion of the oil tank 35, an oil pump 36 for taking up oil that has passed through the oil filter and returning it into the oil vat 3, and an oil pipe 37 which forms a flow path for returning this oil. The oil cleaner 5 itself is provided only in the fryer unit 1b, and oil used and dirtied in the fryer units 1a and 1c also drops into the oil tank 35 via a discharge duct (not shown in the drawings), and is filtered by the oil cleaner 5. The oil is then returned to each of the oil vats 3 using a return pipe (which is not shown in the drawings), which branches from the oil pipe 37 at a position downstream from the oil pump 36 and is connected to the oil vats 3 of the fryer units 1a and 1c.

With the above-described fryer unit 1b, oil is filled into the oil vat 3, and once the oil has been heated, foods are placed into a basket (not shown) and submerged into the oil vat 3 to be cooked. The oil in the oil vat 3 is heated by the heat from the outer wall of the combustion chamber 7 and the tail pipe 15, and the foods are cooked by the hot oil.

The control portion of the fryer unit 1b will be described next. At the top portion of the front wall of the main casing 2, the cooking controller 18 is provided within a casing 21. The cooking controller 18 is for setting the cooking times and the set temperature according to the cooking program. At the bottom portion of the front wall of the main casing 2, the heating controller 19 is provided. The heating controller 19 is for controlling the operation of the pulse burners 4 so that the temperature of the oil is maintained at the set temperature instructed by the cooking controller 18 in accordance with the detected temperature obtained form the oil temperature sensor 6. The primary part of the cooking controller 18 is configured by a microcomputer, and the cooking controller 18 is provided with a display portion 20 for displaying the set temperature and the cooking time, for example, and control switches 38 for controlling its operation.

The cooking controller 18 is adjacent to the oil vat 3, so that it is necessary to prevent the temperature of an electronic circuit board 28 within the cooking controller 18 from rising due to the heat emitted from the oil vat 3. Particularly in a three-vat type fryer such as fryer 1, the cooking controller 18 in the middle receives the heat released from the oil vats 3 of the left and right fryer units 1a and 1c, and thus its temperature increases drastically. For that reason, a cooling fan 25 for cooling and insulating against the heat released from the oil vats 3 is provided only in the cooking controller 18 of the middle fryer unit 1b.

It should be noted that there are electrical components provided inside the heating controller 19 as well, but the heating controller 19 is provided away from the oil vat 3, and thus is not heated as much.

Figure 1:
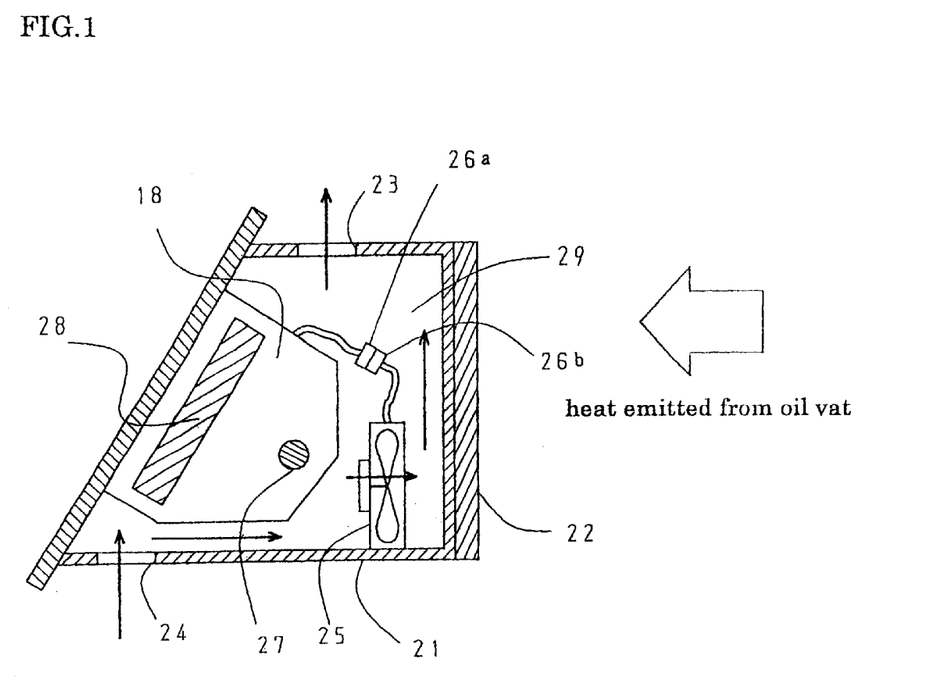
FIG. 1 is a cross-sectional view seen from the side of the casing housing the cooking controller for an embodiment of the present invention.
Figure 3:
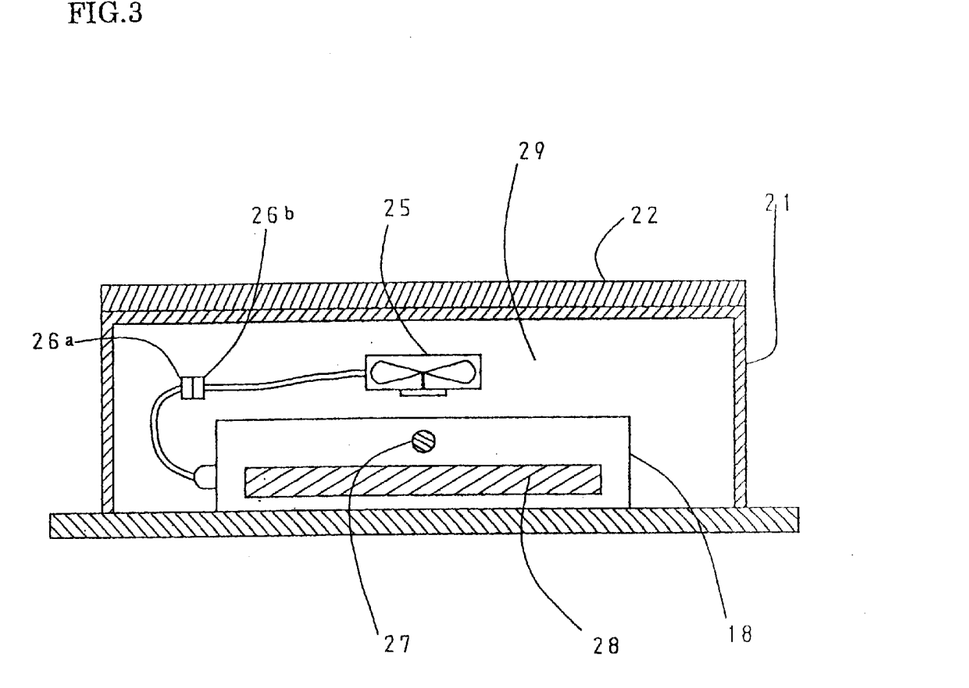
FIG. 3 is a cross-sectional view of the casing housing the cooking controller for the present embodiment seen from above.

The cooling system of the cooking controller 18 will be explained next with reference to FIGS. 1 and 3. FIG. 1 is a cross-sectional view of the casing 21 housing the cooking controller 18 for the middle fryer unit 1b seen from the side. FIG. 3 is a cross-sectional view of the casing 21 housing the cooking controller 18 seen from the top.

The cooking controller 18 is provided at the front within the casing 21, with its control/display panel, facing diagonally upward. An insulating material 22 for blocking out heat from the oil vat 3 is provided at the wall of the casing 21, facing the oil vat 3. A top opening 23 and a bottom opening 24 are provided in the top and bottom walls of the casing 21, and the cooling fan 25 is provided at an intermediate location in an air circulation route 29 from the bottom opening 24 to the top opening 23. When the cooling fan 25 spins, the flow of air from the bottom opening 24 to the top opening 23 generated by the force of the natural draft can be accelerated, and thus the cooling and insulating effect can be further increased.

The cooling fan 25 is connected to the cooking controller 18 via connectors 26a and 26b. The cooking controller 18 checks the connection of the connectors 26a and 26b; and when they are connected, it supplies electrical power to the cooling fan 25 and simultaneously displays a mark indicating the connection on the display portion 20. The cooking controller 18 also detects whether the cooling fan 25 is stopped when they are connected.

On the other hand, although the electronic circuit board 28 in the cooking controllers 18 for the left and right fryer units 1a and 1c is also heated by the heat emitted from the oil vats 3, heat insulation by the insulating material 22 and the flow of air from the bottom opening 24 to the top opening 23 utilizing the force of the natural upward draft which is generated within the casing 21 together provide a sufficient cooling effect and thus the cooling fan 25 is not necessary.

Figure 4:
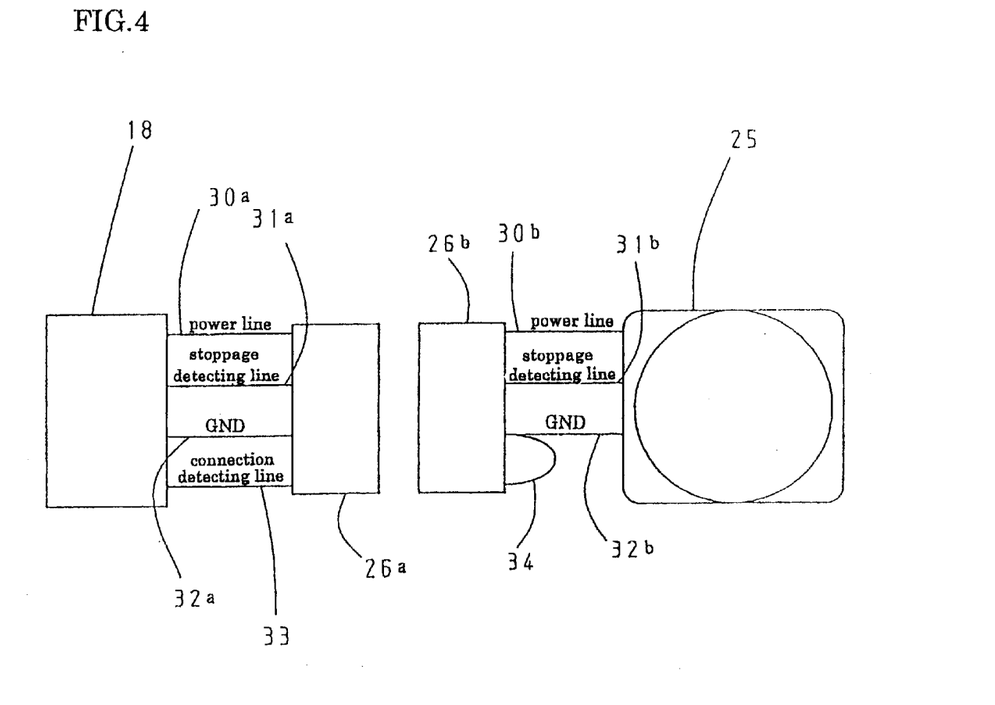
FIG. 4 is a diagram illustrating the method of connection between the cooking controller and the cooling fan via connectors according to the present embodiment.
Figure 5:
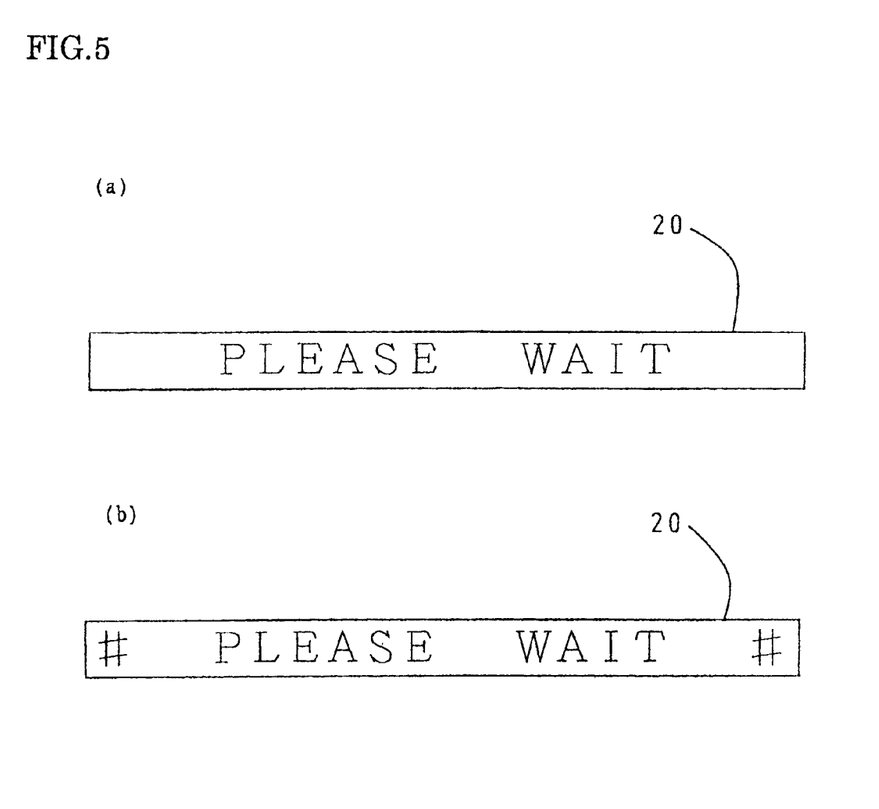
FIG. 5 is a diagram illustrating the display that is shown on the display portion of the cooking controller when the cooking controller of the present embodiment is activated.

The method for detecting whether the connectors are connected is described next with reference to FIG. 4.

The cooking controller 18 and the connector 26a are connected by a wire 30a for supplying direct current for driving the cooling fan 25, a stoppage detecting wire 31a, a GND wire 32a, and a connection detecting wire 33. The cooling fan 25 (fan motor) and the connector 26b are connected by a wire 30b for supplying direct current for driving the cooling fan 25, a stoppage detecting wire 31b, and a GND wire 32b. A short-circuit wire 34 is connected to the GND wire 32b.

The cooking controller 18 is set to a HIGH level by the connection detecting wire 33. When the cooking controller 18 is connected to the cooling fan 25 by establishing a connection between the connector 26a and the connector 26b, the connection detecting wire 33 is connected to the GND wire 32b and shifts to LOW level. Therefore, the connection with the cooling fan 25 is detected.

To prevent overheating of the cooking controller 18, it is unnecessary to provide cooling fans 25 for all the cooking controllers 18, and the cooking controller 18 detects whether it is connected to a fan when the power is turned on, and displays the status of the connection on the display portion 20.

FIG. 5(a) illustrates the appearance of the display when the cooking controller 18 is started up if there is no connection; and FIG. 5(b) illustrates the appearance of the display when the cooking controller 18 is started up if there is a connection. As can be understood from these diagrams, the cooling fan 25 is recognized as connected when the "#" signs are displayed on both sides of the display portion 20.

A temperature sensor 27 is provided inside the cooking controller 18, and it operates the cooling fan 25 when it detects a temperature of 60° C. or higher (and stops the cooling fan 25 when the temperature is below 60°).

The temperature within the cooking controller 18 changes depending on the environment around the fryer 1 and how the fryer 1 is used. Thus, it is possible to prevent energy from being wasted by stopping the cooling fan 25 for example when the fryer units 1a and 1c at the left and right of the fryer 1 are not in use, which means that the temperature within the cooking controller 18 does not become particularly elevated, and that cooling by the cooling fan 25 is unnecessary.

With the fryer 1 described above, the cooling fan 25 provided at the middle fryer unit 1b can cool the cooking controller 18, which easily rises to high temperatures, and inhibit a rise in temperature, that will increase operation reliability and longer life can be achieved.

Further, since the cooking controller 18 automatically detects whether or not the connectors 26a and 26b are connected, in other words whether the cooling fan 25 is connected to the cooking controller 18, it is not necessary to set whether or not there is a cooling fan at each cooking controller and to separately manufacture cooking controllers with distinction of connecting to the cooling fan. Therefore, time-consuming maintenance and settings can be obviated.

As it is displayed whether the cooling fan 25 is connected on the display portion 20 when the cooking controller 18 is started up, it is easy to check whether the cooling fan 25 has been attached during factory shipments.

Furthermore, an unnecessary waste of energy can be prevented because the cooling fan 25 is not driven when cooling by the cooling fan 25 is not required.

The above description of embodiments of the present invention is not intended to limit the present invention, and it is of course possible to develop a variety of embodiments of the present invention within a scope that does not depart from the essential points of the present invention.

For example, in the present embodiment the cooling fan 25 was provided in the cooking controller 18 of the middle unit of a three-vat type fryer, but it is also possible to provide the cooling fan in fryers configured by a plurality of fryer units, such as four-vat type fryers and five-vat type fryers. In such a case, the cooling fan can be provided in cooking controllers sandwiched to the left and right by other fryer units.

Also, a pulse combustion type fryer is provided as an example in the present embodiment, however, there is no limitation to the heating method, and of course the fryer could also be of a type in which the oil vat is heated from the outside by a ceramic plate burner, for example.

As described in detail in the above, with the fryer according to claim 1 of the present invention, a cooling fan provided in a specific cooking controller which is expected to rise to high temperatures due to the heat emitted from an oil vat cools that specific cooking controller. As a result, it is possible to achieve increased operation reliability of the cooking controller and an increased cooking controller lifespan. Also, since the cooking controller automatically recognizes whether the cooling fan is connected, troublesome maintenance and settings at the production site can be obviated, and therefore the cost of manufacturing the fryer can be kept down.

Furthermore, with the fryer according to claim 2 of the present invention, in a three-vat fryer, the cooking controller for the middle fryer unit rises to temperature significantly higher than the left and right cooking controllers, however, it is cooled by a cooling fan, and thus increased operation reliability and an increased lifespan can be achieved Further, with the fryer according to claim 3 and 4 of the present invention, the control display portion displays whether the cooling fan is connected, which makes it possible to easily prevent the cooling fan from not being attached during factory shipment.

Moreover, with the fryer according to claim 5, 6, 7 and 8 of the present invention, the operation of the cooling fan is controlled according to the temperature within the cooking controller, so an unnecessary waste of energy can be prevented.

What is claimed is:

1. A multi-vat fryer in which at least three fryer units are provided in a row, and each fryer unit comprises an oil vat for containing cooking oil, a heating control means for controlling the heating of the cooking oil, and a cooking controller for carrying out settings such as temperature settings and a cooking program and sending a control signal to the heating control means, wherein the cooking controller of each fryer unit comprises a connection detecting means for detecting whether a cooling fan for preventing an electronic circuit board from overheating is connected, and a driving means for driving the cooling fan; and the cooling fan is provided only for the cooking controller of a specific fryer unit of the plurality of fryer units.

2. The fryer according to claim 1, wherein three fryer units are provided in a row, and the cooling fan is provided only for the cooking controller of the middle fryer unit.

3. The fryer according to claim 1, wherein the cooking controller is provided with a control display portion for controlling and displaying temperature settings and the cooking program, and the control display portion displays whether the cooling fan detected by the connection detecting means is connected.

4. The fryer according to claim 2, wherein the cooking controller is provided with a control display portion for controlling and displaying temperature settings and the cooking program, and the control display portion displays whether the cooling fan detected by the connection detecting means is connected.

5. The fryer according to claim 1, wherein the cooking controller is provided with a temperature sensor, and the cooling fan is driven only when the temperature detected by the temperature sensor is a certain temperature or higher.

6. The fryer according to claim 2, wherein the cooking controller is provided with a temperature sensor, and the cooling fan is driven only when the temperature detected by the temperature sensor is a certain temperature or higher.

7. The fryer according to claim 3, wherein the cooking controller is provided with a temperature sensor, and the cooling fan is driven only when the temperature detected by the temperature sensor is a certain temperature or higher.

8. The fryer according to claim 4, wherein the cooking controller is provided with a temperature sensor, and the cooling fan is driven only when the temperature detected by the temperature sensor is a certain temperature or higher.

* * * * *